(12) United States Patent
Dao

(10) Patent No.: US 8,684,444 B2
(45) Date of Patent: Apr. 1, 2014

(54) INSTANT CAR COVER

(71) Applicant: Thang Manh Dao, San Jose, CA (US)

(72) Inventor: Thang Manh Dao, San Jose, CA (US)

( * ) Notice: Subject to any disclaimer, the term of this patent is extended or adjusted under 35 U.S.C. 154(b) by 0 days.

(21) Appl. No.: 13/887,315

(22) Filed: May 4, 2013

(65) Prior Publication Data

US 2013/0300149 A1    Nov. 14, 2013

Related U.S. Application Data

(63) Continuation of application No. 13/185,321, filed on Jul. 18, 2011, now abandoned.

(51) Int. Cl.
*B60J 7/00*    (2006.01)

(52) U.S. Cl.
USPC ........................................ 296/136.01; 296/98

(58) Field of Classification Search
USPC ..................... 293/136.01, 136.07, 136.1, 98
See application file for complete search history.

(56) References Cited

U.S. PATENT DOCUMENTS

| | | | | |
|---|---|---|---|---|
| 4,929,016 A | * | 5/1990 | Kastanis | 296/136.03 |
| 5,762,393 A | * | 6/1998 | Darmas, Sr. | 296/98 |
| 6,935,674 B1 | * | 8/2005 | Campos | 296/98 |
| 7,311,112 B2 | * | 12/2007 | Pacheco | 135/88.07 |

* cited by examiner

*Primary Examiner* — Joseph Pape

(57) ABSTRACT

The present invention provides a compact covering for automobiles. This device is configured to be located on a windshield of vehicles, where it is anchored to the necks of side mirrors by elastic straps. The device has four rolls of cover-sheets and a housing which is constructed of two halves inserted fitly into each other. It is easily placed onto its working position by way of a wheel and suction-cups. Cover-sheets will be pulled out via apertures on the housing and stretched over the vehicle. To help pulling easily, each of the cover-sheets will have a pipe-shaped stopper attached at its outer end. Each of the pipe-shaped stoppers will have hooks which hooks onto the edge of the chassis of the vehicle. The axes of cover-sheets rolls are mounted with the constant springs, so they can rewind after each use. Brushes above the apertures will swipe off dust, tree leaves, etc. from cover-sheets when they are rewound.

3 Claims, 5 Drawing Sheets

INSTANT CAR COVER

FIELD OF THE INVENTION

The present invention relates to a cover for vehicles and more specifically to a compactly designed device for automobiles.

BACKGROUND OF THE INVENTION

There have been many inventions about coverings for vehicles. Those coverings however are typically cumbersome and difficult to use.

Let's take a look at the conventional umbrella we often use to shield ourselves from sun or rain. The question came up here is how to make a device which is light, compact and easy to use in the same manner as we use the conventional umbrella. The present invention will provides such a convenient device.

SUMMARY OF THE INVENTION

The object of the invention is to provide a car cover which is light, compact and easy to use, in the same manner as we use our conventional umbrella.

DESCRIPTION OF THE INVENTION

Figure 1:
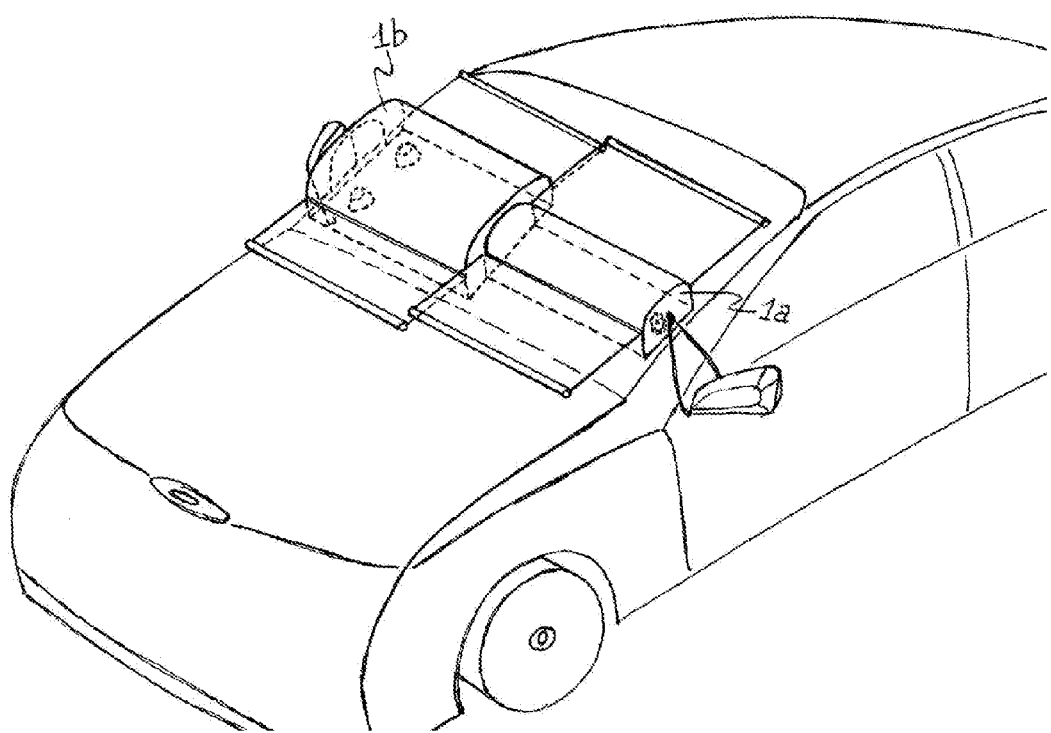
FIG. 1 shows perspective view of the device placed on the windshield of an automobile.
Figure 2:
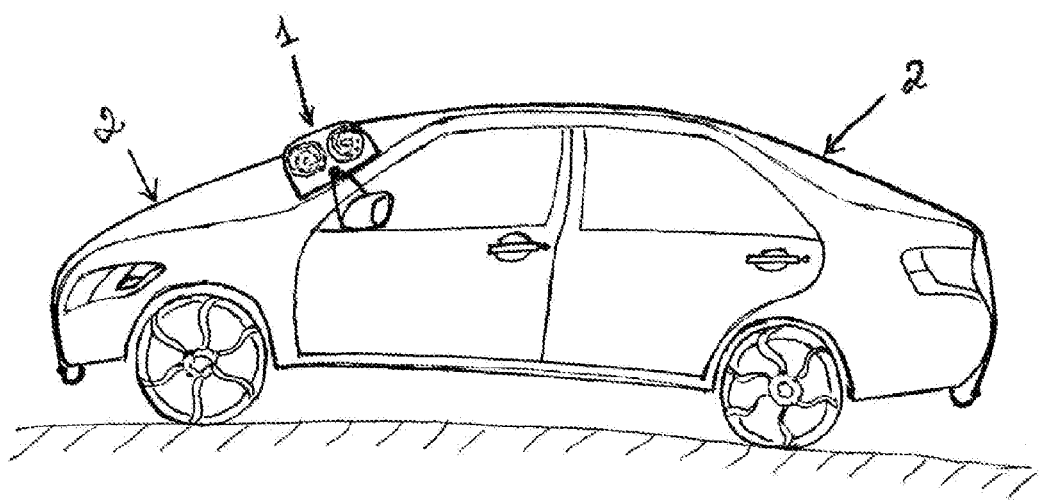
FIG. 2 shows side view of the device placed on the windshield of an automobile; with straps looped to the necks of side minors; and the cover-sheets stretched over the body of vehicle and hooked onto the edges of the chassis.
Figure 3:
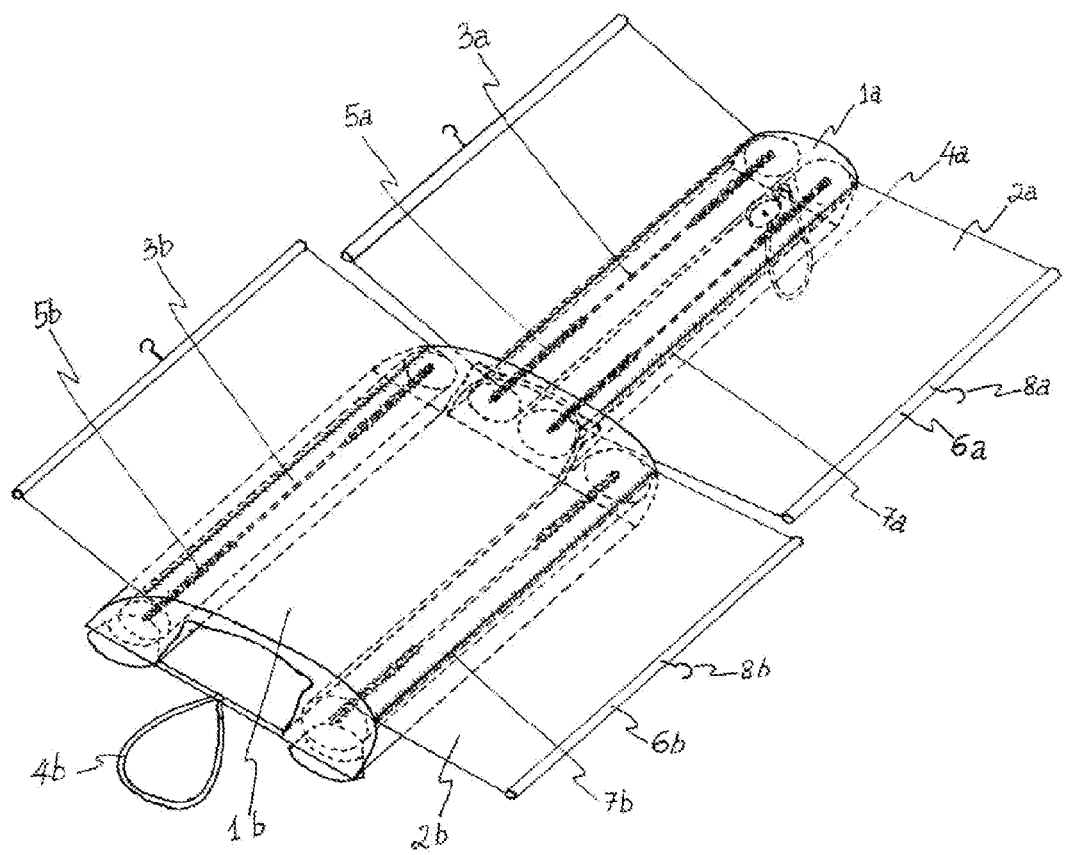
FIG. 3 is a perspective view showing the detailed structure of the device.
Figure 4:
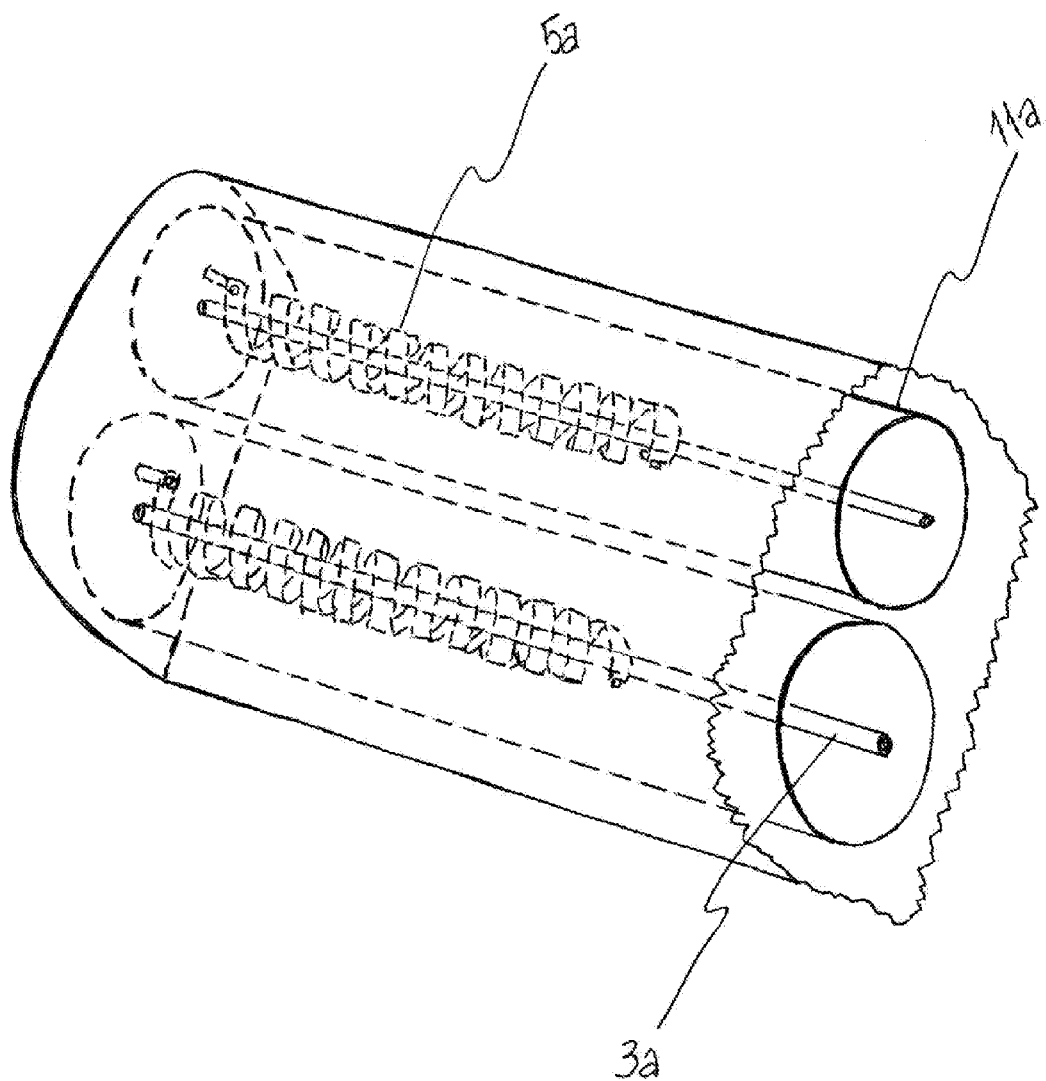
FIG. 4 is a partial view of a portion of the device showing the details of the rollers, axes and constant springs.
Figure 5:
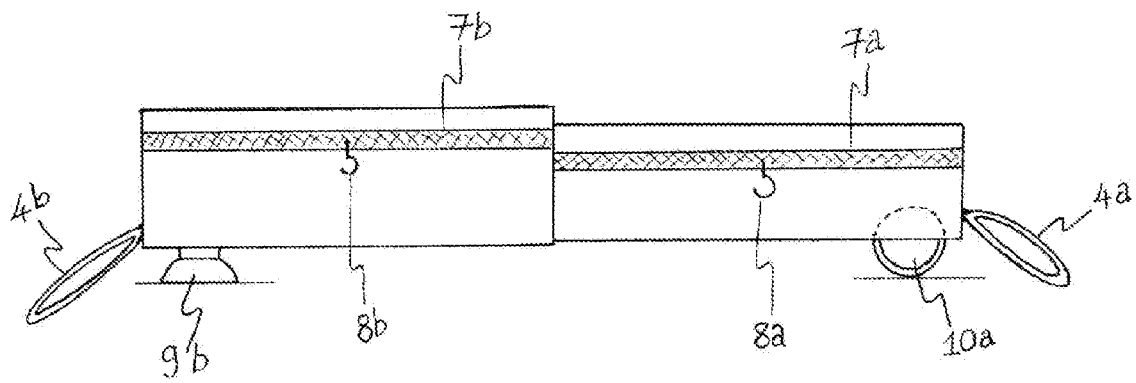
FIG. 5 is a front view of the device illustrating the straps, suction-cups and wheels.

We drives our vehicles every day to go to work, shopping or anywhere else. When we park the vehicle, if a cool parking lot under a tree shadow, for example, is not available, then most of time the vehicle will be exposed to the natural weathers such as sun, rain, hail and so on. Imagine of a hot day in summer time, sun can broilingly heat up over of the vehicle, and so it damages both the body paint and the interior. Contrarily, in a rainy day, the shower impetuously pours acid-contained water over the vehicle. Yet, besides of those weather elements, dust, tree leaves and bird stools are usually dropped and deposited onto the paint of vehicle. All of those factors are degrading the value of vehicles.

Any vehicle-owner wants to protect his or her vehicles from those elements so they can last longer. However, looking for a vehicle cover which is convenient to use instantly when needed seems impractical on the market nowadays. Therefore, the present invention will aim at providing a covering device for automobiles which will have characters of light-weighted, compact-designed, and easy in use.

The present invention relates to a device to cover motor vehicles including but not limited to cars, minivans, suvs, trucks, and so on.

The present invention comprises a device to cover motor vehicles and a method of using the device. The device according to the present invention will have a special design to do a function of covering an automobile in a very easy and convenient way. The method of using the device to cover an automobile according to the present invention is characterized in that it chooses the windshield of vehicles to locate the device. Furthermore, this method also characterized in that it will use the necks of side mirrors on vehicle to anchor the device. Typically, due to the inclined angle of the side minors towards the rear of vehicle, they become ideal posts to hold the device.

According to the present invention, the device comprises a housing (1a, 1b), cover-sheets (2a, 2b), rollers (11a, 11b), axes (3a, 3b), elastic straps (4a, 4b), constant springs (5a, 5b), pipe-shaped stoppers (6a, 6b), brushes (7a, 7b), hooks (8a, 8b), suction-cups 9b and a wheel 10a.

The housing is constructed of two halves which can be inserted fitly into each other. The smaller half of the housing is designed to have its shape being able to smoothly slide into the center of the bigger half. This design style brings in a compact structure which helps to save space when it is stored in, for example, the trunk of vehicle. The housing will be made to have a firm structure yet its weight to be light enough so as to be placed on the windshield of an automobile. The bottom of the housing may attach with several pads of rubber which cushion the housing in case of its impact with the windshield and so help to prevent the windshield from damage or scratches. As the smaller half of the housing is pulled out from the center of the bigger half, the full length of housing is expanded across over the width of vehicle, as shown in FIG. 1. The wheel (10a) underneath of the housing will effectively help putting the device into its working place and then the suction-cups (9b) secure it from moving. The elastic straps (4a, 4b) on two ends of the device will be looped on to the necks of side minors and so fasten the housing to the windshield. Scrolled on the rollers (11a, 11b), the cover-sheets (2a, 2b) now are pulled out to cover the body of vehicle. The axes (3a, 3b) of rollers are equipped with one or more constant springs (5a, 5b) so that they can rewind by themselves once released after each use. The cover-sheets are pulled out through the apertures along the body of the housing. The outer end of each of the cover-sheets will attach to one of pipe-shaped stoppers (6a, 6b) which keep the cover-sheets from being pulled into the housing. The pipe-shaped stoppers will have hooks (8a, 8b). The hooks will be hooked into the edge of the chassis of the vehicle in the using position when the cover-sheets are stretched out over the body of vehicle. Above each of the apertures there will be a brush (7a, 7b) that sweeps away dirt, tree leaves, bird-stools and the like from surface of the cover-sheet when it is rewound back into the housing. The material of the cover-sheets is selected from categories such as polyvinyl or canvas which have characters of tough and weather-resistant. The material will have to be able to resist sun-heat, rain, snow, hail, dirt, bird-stools, and so on.

Due to the typical shape of automobiles, it will be easy for the user to implement steps of deploying the present device in the following order:

1. Place the device on to the windshield and pull the elastic straps over the side minors of vehicle. The backwards-inclined angle of the side mirrors help to hold the device well.

2. Pull the front cover-sheet to cover the hood of vehicle and fasten it by hooking into the edge of the chassis.

3. At this position, the device is firmly held. Now the rear cover-sheet roll will be pulled out to cover the rest of vehicle body.

I claim:

1. An instant vehicle cover assembly comprising:

a housing including first and second portions, the first portion including an interior volume with a pair of lateral edge areas and a center area, the second portion comprising an interior volume with a pair of lateral edge areas, the second portion is selectively housed within the center area of the first portion when in a stored position and then extended from the center area when in a use position, each of the pair of lateral edge areas of each of the first and second portions of the housing including a roller around which a cover sheet is disposed, the cover sheet is retracted by use of a spring into a stored position within each housing portion and is selectively extended from the roller into a vehicle covering position, each cover sheet includes a first end attached to the roller and a distal end having a pipe shape stopper and a hook for securement of the cover sheet to the vehicle chassis when in a use position, and an elastic strap attached to a distal end of each of the first and second portions of the housing, wherein each strap is wrapped around a neck region of a side mirror of the vehicle for securement of the housing when in a use position.

2. The instant vehicle cover of claim 1, further comprising a suction cup on the underside of the first portion of the housing and a wheel on the underside of the second portion of the housing, wherein when the cover assembly is placed on the top of the vehicle for use, the section cup is secured to the top of the vehicle then the second portion of the housing is extended from the first portion of the housing with assistance from the wheel on the second portion of the housing which is rolled along the top of the vehicle.

3. The instant vehicle cover of claim 1, wherein each roller is extended from within each housing portion through apertures therein and each aperture further comprising a brush that sweeps away dirt and debris from the cover sheets while being retracted into the stored position.

* * * * *